United States Patent [19]
Riegel et al.

[11] Patent Number: 5,619,267
[45] Date of Patent: Apr. 8, 1997

[54] VIDEO DECODER INCLUDING A CONTROL UNIT

[75] Inventors: Maximilian Riegel, Nürnberg; Ulrich Stenzel, Leinburg, both of Germany

[73] Assignee: U.S. Philips Corporation, New York, N.Y.

[21] Appl. No.: 599,517

[22] Filed: Jan. 29, 1996

Related U.S. Application Data

[63] Continuation of Ser. No. 196,915, Feb. 15, 1994, abandoned.

[30] Foreign Application Priority Data

Feb. 26, 1993 [DE] Germany .......................... 43 05 911.2

[51] Int. Cl.$^6$ .................................................. H04N 7/50
[52] U.S. Cl. .......................... 348/400; 348/403; 348/407
[58] Field of Search ................................... 348/400, 401, 348/402, 403–407, 409–413, 415–416, 417, 438, 699; 382/41; H04N 7/50

[56] References Cited

U.S. PATENT DOCUMENTS

| | | | |
|---|---|---|---|
| 5,150,432 | 9/1992 | Ueno et al. | 348/438 |
| 5,193,002 | 3/1993 | Guilhard et al. | 348/409 |
| 5,237,410 | 8/1993 | Inoue | 348/417 |
| 5,311,310 | 5/1994 | Jozawa et al. | 348/416 |
| 5,355,378 | 10/1994 | Ohta | 348/699 |
| 5,365,271 | 11/1994 | Asano | 348/402 |
| 5,367,629 | 11/1994 | Chu et al. | 348/403 |
| 5,379,351 | 1/1995 | Fandrianto et al. | 382/41 |
| 5,384,849 | 1/1995 | Jeong | 348/404 |
| 5,428,395 | 6/1995 | Jeong | 348/412 |

FOREIGN PATENT DOCUMENTS

| | | | |
|---|---|---|---|
| 3917085 | 11/1989 | Germany | H04N 5/14 |
| 4017375 | 12/1991 | Germany | H04N 7/133 |
| 4128977 | 3/1993 | Germany | H04N 7/133 |

OTHER PUBLICATIONS

"Motion Video Coding for Visual Telephony", 1989 PTT Research Neher Laboratories, Leidschendam NL.
Draft Review of Recommendation H.261: Videocodec For Audiovisual Services At p x kbit/s. Signal Processing: Image Communication 2 (1990), pp. 221 to 239, Elsevier Science Publishers BV.
"Design of a H.261 video codec with 12 Xilinx LCAs", Pralen et al, Euro Asic '92, pp. 386–389.
"A hardware motion compensator for a videoconferencing codec", Parke, IEE Collog. (1990), No. 128:Applications of Motion Compensation, pp. 1–6.
"Moving Picture Coding System for Digital Storage Media using Hybrid Coding", Nagata et al, Signal Processing:Image Communication 2 (1990) pp. 109–116.

*Primary Examiner*—Howard W. Britton
*Assistant Examiner*—Vu Le
*Attorney, Agent, or Firm*—Laurie E. Gathman

[57] ABSTRACT

A video decoder including a control unit (CC), a picture memory (P) and a loop filter (F) for blockwise decoding of coded video pictures (q). The blockwise decoding generally leads to artefacts in the display of the decoded video pictures on a monitor (M), which artefacts can be substantially suppressed by filters arranged downstream of the decoder. A similarly substantial suppression of the artefacts with a small extension of the number of components is characterized by means with which the control unit (CC) is enabled, in the decoding intervals,
(a) to read predetermined pixel data of a decoded video picture from the picture memory (P) and to apply them to the loop filter (F) for the purpose of filtering,
(b) to select the predetermined pixel data in such a way that the filtering operation is performed beyond the block edges of the blocks provided for decoding. The measures described are compatible with a decoder as defined in the H.261 Recommendation.

12 Claims, 3 Drawing Sheets

VIDEO DECODER INCLUDING A CONTROL UNIT

This is a continuation of application Ser. No. 08/196,915, filed Feb. 15, 1994, now abandoned.

BACKGROUND OF THE INVENTION

The invention relates to a video decoder comprising a control unit, a picture memory and a loop filter.

Fundamental functional and constructive features of such a video decoder are described in, for example the H.261 Recommendation (cf., for example Draft Revision of Recommendation H.261: Videocodec for Audiovisual Services at p×kbit/s. Signal Processing: Image Communication 2 (1990), pp. 221 to 239, Elsevier Science Publishers BV). This Recommendation will hereinafter be referred to by (1).

FIG. 3 in (1) shows the circuit diagram of an associated coder whose operation and structure are similar to the function and construction of a decoder, as will now be explained in broad outline.

The coder in accordance with (1) is a predictive coder in which the data of a decoded video picture are used as prediction values for the data of the subsequent video picture. In general, the difference (prediction errors) between the values of an input picture and the prediction values is coded and transmitted. In exceptional cases one refrains from the subtraction and the unchanged input picture is coded and transmitted. When the prediction error is coded, the coder operates in the interframe mode, and in the opposite case it operates in the intraframe mode. When motion pictures are concerned, a motion estimation may also be performed so as to obtain better prediction values for these types of pictures.

Due to the prediction coding, the coder includes a feedback loop with a picture memory in which the prediction values—thus the video picture which has preceded the input picture and has been coded and decoded again—are buffered. Consequently, the feedback loop comprises further functional units which eliminate the operations performed in the coding branch, in so far as this is possible. Moreover, the feedback loop includes a low-pass filter referred to as the loop filter.

The coding branch itself includes a transform unit which subjects the data of an input picture in blocks to a two-dimensional discrete cosine transform (DCT) in, for example the intraframe mode. These dam blocks are either the luminance values of a quadratic section of the picture consisting of 8×8 pixels, or the 8×8 chrominance values ($C_B$ or $C_R$) of a quadratic section of a picture obtained by sub-sampling, which section consists of 16×16 pixels. All dam of a quadratic picture section of 16×16 pixels are referred to as macroblocks.

The overall quantity of pixels of a video picture is subdivided without gaps into quadratic picture sections (for the sake of simplicity also referred to as blocks or macroblocks), whose associated data blocks are successively transformed. A quantizer converts the DCT transform coefficients dually represented by twelve bits into quantization indices which—in a variable-length coded form—are written into a buffer memory for the purpose of transmission.

In accordance with the operations described hereinbefore, the feedback branch comprises a functional unit which—save for the inevitable quantization errors—converts the quantization indices into original coefficients again, and an inverse transform unit which cancels the cosine transform.

With a subsequent adder, the prediction values are added again only in the case of coding a difference picture, and the full video picture thus regained is stored in the picture memory of the feedback branch. The picture memory precedes the loop filter whose output is connected to an input of the subtracter as well as to an input of the adder via a controllable switch. It improves the prediction for motion pictures.

The described coding and decoding processes are controlled by a control unit. It controls, inter alia the quantizer and the loop filter through corresponding signals. The quantizer has 31 settings which, according to (1), can only be changed from macroblock to macroblock. The associated control signal (indication signal) is transmitted by the control unit to the quantizer as well as to the receiver. In accordance with the settings of the quantizer, it may assume 31 values. The larger the value, the coarser the quantization.

The blocks stored in the picture memory are filtered in a two-dimensional and linear way by the loop filter. More specifically this means that, for example the data of three pixels of a block which are located in a horizontal row of pixels are linearly averaged by means of the weighting factors ¼, ½, and ¼. The control unit reads these data by transmission of addresses at the address input of the picture memory and stores them in buffer memories of the loop filter. Pixels located at the right-hand or left-hand edge of a block are not filtered in the case of horizontal filtering. As soon as the control unit transmits the addresses of these peripheral pixels, the loop filter is deactivated. The same applies in the case of vertical filtering of the peripheral pixels at the upper and lower edges of a block. The loop filter is also deactivated when the coder operates in the intraframe mode.

Transmitted video pictures are decoded at the receiver end by a decoder comprising a circuit of functional units corresponding to the functional units in the feedback branch of the coder. The prediction values in the coder correspond to the decoded data in the decoder.

The described processing of video pictures in blocks has unwanted consequences when video pictures are displayed on a monitor. Particularly at low transmission bit rates, the decoded pictures show block edges which, overall, constitute a more or less fixed grating on the monitor which considerably degrades the quality of the displayed pictures. A number of proposals is known for possibly completely filtering such a block grating by postprocessing the decoded video pictures (cfi, for example DE 39 17 085, DE 40 17 375, DE 41 28 977). In these known proposals the number of components in the circuit required for such a filter is considerable, because such a filter is to be composed of separate components and should be connected to the output of a decoder as described in (1).

SUMMARY OF THE INVENTION

It is an object of the invention to postprocess a video signal decoded in accordance with (1) with a minimal number of circuit-technical means.

This object is achieved by a decoder of the type described and by means with which the control unit is enabled, in the decoding intervals, to read predetermined pixel data of a decoded video picture from the picture memory and to apply them to the loop filter for the purpose of filtering, to select the predetermined pixel data in such a way that the filtering operation is performed beyond the block edges of the blocks provided for decoding.

Advantageous embodiments are characterized in that
the control unit is enabled to filter the predetermined pixel data between decoding operations of two video pictures,
the predetermined pixel data are the data of picture sections whose geometrical dimensions correspond to those of the blocks provided for decoding, but whose geometrical positions are offset vertically and horizontally with respect to the position of these blocks,
the offset covers half a block edge length,
the loop filter is only activated for the pixels which are peripheral pixels of the blocks provided for decoding.

The small number of components is achieved by the invention in that a loop filter which is present anyway in a decoder as described in (1) is combined with the picture memory, which is also present, to form a postprocessing unit by realising a small number of complementary elements in the control unit. The dual function of these two elements thus results in the envisaged advantage.

Since in the operation of a decoder, without using the invention, the data of a picture stored in the picture memory are filtered in blocks, for which the required control programs are provided in the control unit, these control programs are also used for the invention in that in the postprocessing operation the block-sequential filtering of a video picture is only repeated with changed addresses for the pixels. A fixed address is added to the pixel addresses provided for the decoding process so that a block-sequential filtering is also possible with the new addresses. The difference only consists in that the block structure in the postprocessing operation is shifted by half a block diagonal towards the centre of the picture as compared with the block structure in accordance with (1). The block structure is herein understood to mean the division of the video pictures into 8×8 blocks. The block structure according to (1) will herein be referred to as C structure (coding block structure) and the block structure for postprocessing will herein be referred to as N structure. The N structure is superimposed on the C structure in such a way that the block edges of the C structure fall within the blocks of the N structure. Consequently, when filtering with the N structure, the filtering operation is performed v/a the block edges of the C structure, thus via those parts of the video picture which are the cause of the above-mentioned picture disturbances.

As, in operation, the loop filter is also to be activated and deactivated when the invention is not used, this part of the program can also be advantageously and simply used when performing a postprocessing operation. The filter is only activated when peripheral pixels of the C structure are filtered. For all other pixels the filter is deactivated.

BRIEF DESCRIPTION OF THE DRAWINGS

These and other aspects of the invention will be apparent from and elucidated with reference to the embodiments described hereinafter in conjunction with.

In the figures in which.

DETAILED DESCRIPTION OF THE PREFERRED EMBODIMENT

Figure 1:
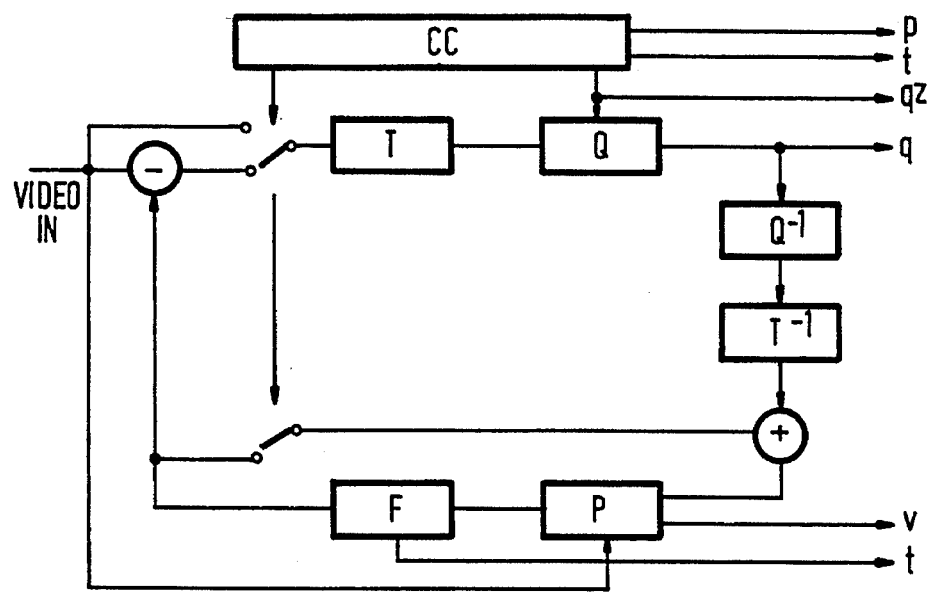
FIG. 1 shows the circuit diagram of a coder in accordance with the H.261 Recommendation.

The input data VIDEO IN are applied to the (source) coder shown in FIG. 1 via a connection which is shown at the top left in the Figure. These are the pixel data of block-structured video pictures. The input data are applied to a picture memory P (which also includes a motion estimator), to a subtracter for forming the prediction error and to an input of a controllable change-over switch. The change-over switch is controlled by a control unit CC which also sets a quantizer Q. Either the prediction error or the unchanged input signal is applied via said controllable change-over switch to the input of a transform unit T which performs a discrete cosine transform with the data of each block.

The transform coefficients are applied to a quantizer Q which converts these coefficients into quantization indices and writes them, inter alia, as signal q in a variable-length coded (VLC) form into a buffer memory (not shown). For obtaining the prediction values, the coder of FIG. 1 comprises a feedback loop which also receives the signal q. The transform coefficients converted into quantization indices are formed to 12-bit code words in a unit $Q^{-1}$ of the feedback loop. A subsequent unit $T^{-1}$ cancels the cosine transform. When the prediction error has been coded, the prediction values are added to the regained signal by means of an adder which is preceded by the unit $T^{-1}$. In the opposite case, the regained signal is written in an unchanged form into the picture memory P. The prediction values for coding the next picture in the case of motion pictures are freed from their short-wave parts by means of a loop filter F.

The signals p, t, qz, v and t which have not been mentioned so far but are shown in FIG. 1 are side information components which have a subordinate significance for the invention. They are necessary for controlling the decoding process at the receiver end.

Since FIG. 1 only serves an explanatory purpose, for example, many control connections and clock connections are not shown for the sake of clarity of the Figure. However, it is known to those skilled in the art which control connections and clock connections are to be used for interconnecting the individual elements. Further information will therefore not be given here. For example, the unit $Q^{-1}$ as well as the unit Q should both be controlled by the signal qz.

A decoder in accordance with (1) does not require the elements of the coding branch (including the subtracter at the input). Such a decoder processes the transmitted signal q by means of units which have the same function as those of the coder in the feedback branch of FIG. 1 and are thus denoted by the same reference symbols. The prediction signal at the transmitter end corresponds to the decoded video signal at the receiver end. While taking said limitations and slight changes into account, FIG. 1 thus also represents the circuit diagram of a decoder in accordance with (1).

Figure 2:
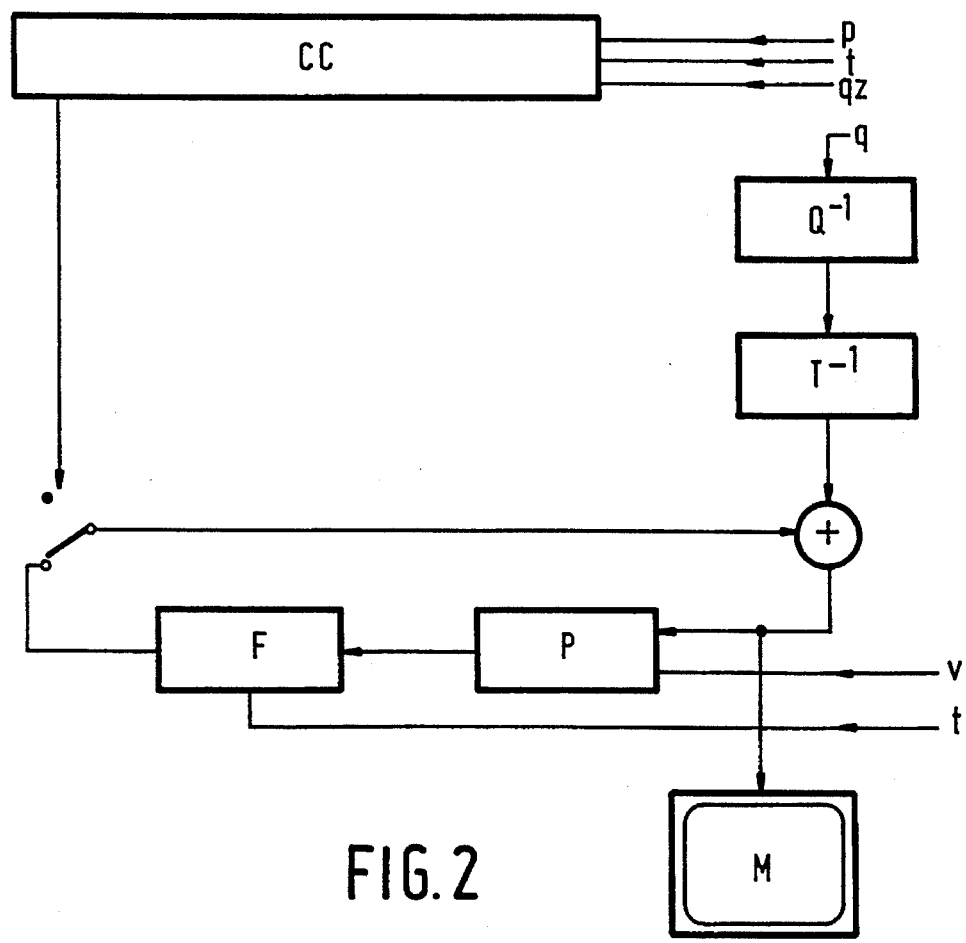
FIG. 2 shows the block diagram of a decoder.

For the sake of completeness, FIG. 2 also shows a decoder in accordance with (1) in the form of a block diagram. Similarly as at the transmitter end, the central control unit CC controls the decoding process at the receiver end, inter alia by addressing the picture memory P via address connections (not shown). A two-dimensional address is associated with each pixel of a video picture by means of the control unit CC. This provides the possibility, with small extensions, of using complete sections of programs performed by the control unit CC, for example, for pixels which are shifted by a fixed vector as compared with the situation according to (1). The loop filter can also be suited for deactivation by means of small extensions of the programs stored in the control unit CC for each pixel instead of only for block edge pixels of the C structure as in (1). The invention utilizes this facility, deviating from (1), of additionally processing the pixels. The picture stored in the picture memory P is read once more, for example in the intervals between two consecutive pictures and filtered by the loop filter F in such a way that the block edges of the C structure are smoothed. The picture thus filtered is not written into the memory P, because otherwise the prediction data would be lost. Instead, it is displayed on the screen of a monitor M directly after the filtering operation, and after the format conversion which may be necessary under circumstances.

Figure 3:
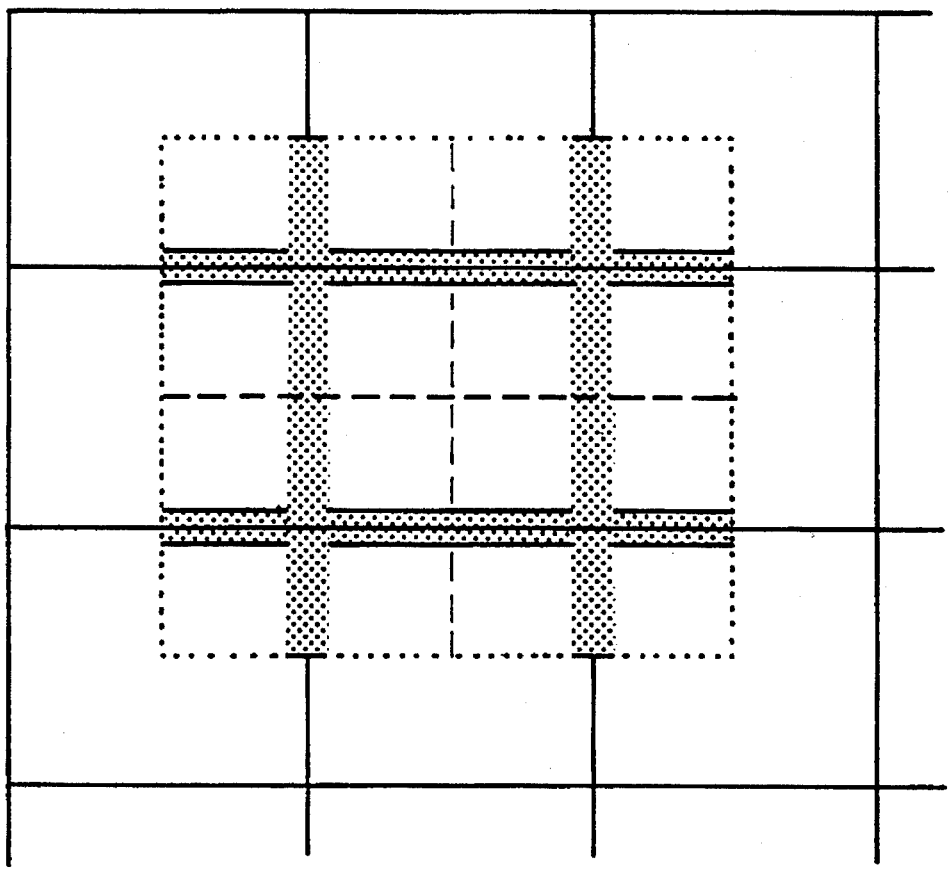
FIG. 3 shows a two-dimensional section of a video picture with different block structures.

FIG. 3 shows diagrammatically a section of a video picture, viz. a section of the upper left part of the picture. The solid lines are the block edges according to (1), i.e. the block edges of the C structure. Each block of this structure comprises 64 pixels. The addresses of the pixels located furthest to the left and furthest to the top may be represented, for example in the form of (1,1) in which the first 1 is the horizontal component and the second 1 is the vertical component of the address. The pixel at the bottom right in the upper left block then has the address (8,8).

The broken lines in FIG. 3 represent the block edges of the N structure. The N structure used in the example is obtained from the C structure in that the address (4,4) is added to all addresses. As is shown in FIG. 3, the edges of the C structure fall within the N structure. If the filtering operation of the N structure is performed in blocks, as is done for the C structure in (1), disturbances at the original block edges are substantially filtered out. The filtering process in accordance with (1) will only be performed with the addresses (a+4,b+4) in which a and b are arbitrary horizontal and vertical address components of an arbitrary pixel for the filtering operation.

Figure 4:
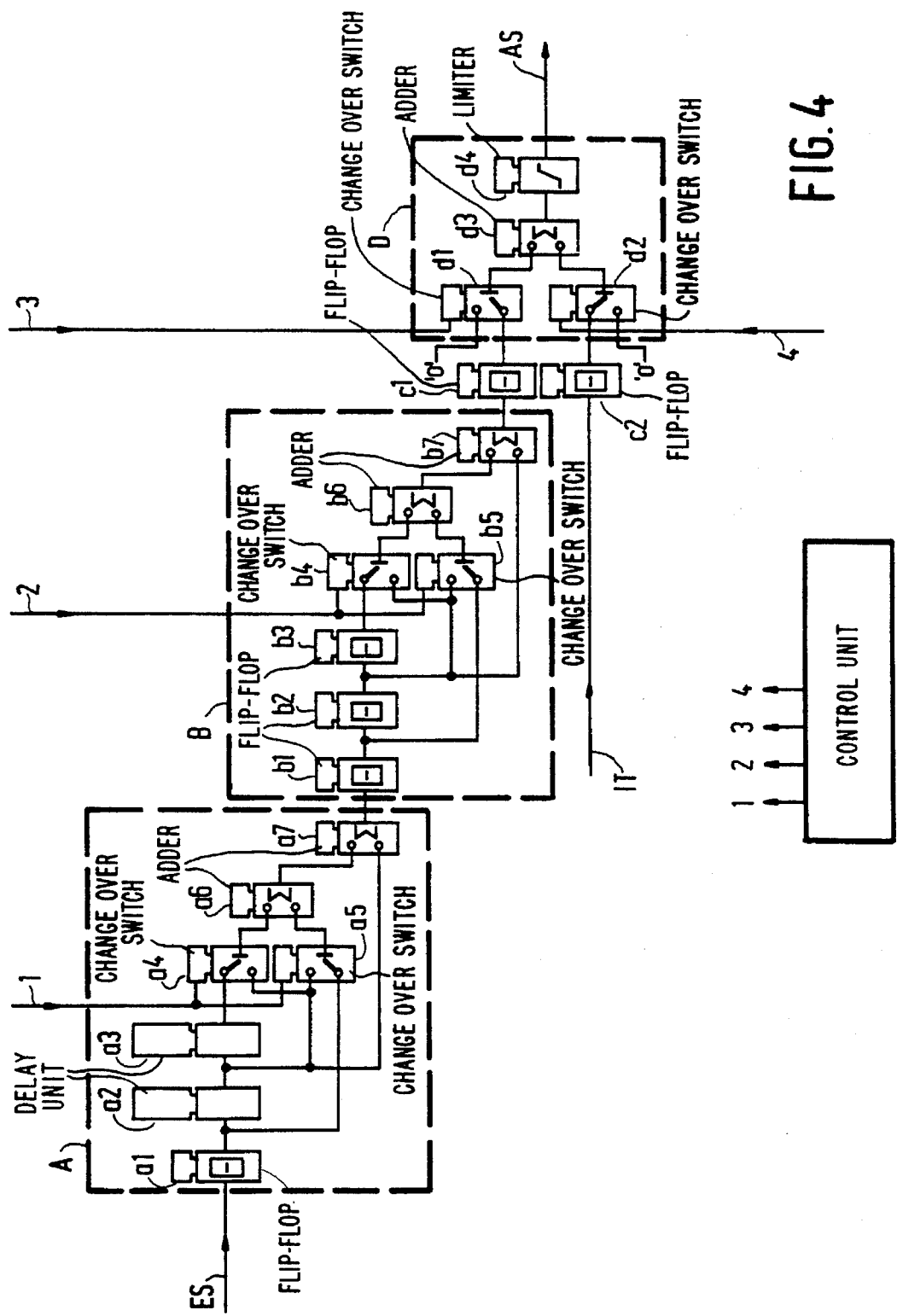
FIG. 4 shows a block diagram of a loop filter.

An advantageous modification of the filtering operation in accordance with the N structure is also shown in FIG. 3: only pixels of the N structure located in the shaded area are filtered, thus in the block edge areas of the C structure. For all other pixels the filter is deactivated. FIG. 4 shows an arrangement of a loop filter according to FIG. 2 and elements which, viewed in the signal direction, are arranged downstream of the loop filter F. The arrangement can be roughly divided into three functional units, viz. a vertical filter A, a horizontal filter B and a change-over switch with an adder D.

The data read from the picture memory P are applied via a connection ES and data are written into the picture memory P again via a connection AS, or displayed on the monitor M of FIG. 2. A connection IT is connected to the output of the unit $T^{-1}$. The units A, B and D of the loop filter F are controlled via control connections. The pixel data of a block are line-sequentially applied to an input flipflop a1 via the connection ES. The pixel data which have been written into the memory are delayed by one block line in the subsequent delay members a2 and a3. For example, if the data of the first pixel of the first block line are present at the output of the delay member a3, the dam of the first pixel of the second block line are present at the output of the delay member a2 and the data of the first pixel of the third block line are present at the output of the flipflop a1. The data present at the outputs of the elements a1, a2 and a3 are the data of pixels which directly succeed one another on a vertical straight line in the video picture. Filtered data are then gained from this data triplet for the central pixel in that the data of the triplet are initially added with the weighting factors 1, 2 and 1. The addition of the two peripheral pixels of the triplet is realised by an adder a6. The data of the central pixel are doubled by varying the setting at the input of the adder a7, which is not directly shown in FIG. 4.

The vertical filter A is deactivated by a control signal through the control connection 1 in that change-over switches a4 and a5 are set to their second position. In this position each input of the adder a6 receives the central value of the pixel triplet so that the data of the central pixel appear with a fourfold weight at the output of the adder a7. The vertically filtered data are now applied in block lines to the horizontal filter A. The data are delayed by an arrangement of D flipflops b1, b2 and b3 by one pixel clock. Consequently, the (vertically filtered) data of pixels are present at the outputs of the flipflops b1, b2 and b3, which pixels directly succeed one another on a horizontal straight line in the video picture. The function of change-over switches b4 and b5, as well as that of adders b6 and b7 entirely corresponds to the functions of the adders and change-over switches a4, a5, a6 and a7 so that they will not be explained.

The vertically and horizontally filtered pixel data are present at the output of the adder b7. In order that the weighting of ¼, ½ and ¼ required in (1) is realised both for the horizontal and for the vertical filtering, the data present at the output of the adder should be divided by 16. This division is also realised by a change of settings known to those skilled in the art of the data (shown in the dual system) at the output of the adder b7. The data which have been weighted as prescribed are now applied via a flipflop c1 to a first input of a further change-over switch d1. Dependent on the position of this change-over switch d1, the filtered data or a binary zero are applied to a first input of a subsequent adder d3. The change-over switch d1 corresponds to the change-over switch shown in FIG. 2, whose position is only changed by the control unit CC when the decoder changes from the intraframe mode to the interframe mode, conversely.

A further change-over switch d2, which is arranged downstream of a flipflop c2, either applies the data from the unit $T^{-1}$ or binary zeros to the second input of the adder t3. The change-over switch d2 is in the position shown (in which the data of the unit $T^{-1}$ are conveyed) when the filters A and B are used only for decoding, thus when the invention is not used. The binary zeros are passed on when the decoder is brought to its "postprocesing" mode.

A limiter d4 limits the data before they are written into the picture memory P again via a connection AS or are displayed on the monitor M. The position of the change-over switch d2 can be changed via a control connection 4.

The "postprocessing" mode is compatible with all other modes described in (1).

We claim:
1. A video decoder for performing blockwise decoding operations of coded video pictures using decoding blocks of pixel data having block edges, and for post-processing a blockwise decoded video picture, comprising:

a picture memory for storing the pixel data of the blockwise decoded video picture;

a control unit for blockwise selecting addresses of the picture memory which addresses define the decoding blocks;

a loop filter for filtering the blockwise selected pixel data within the decoding blocks but not the block edge blockwise selected pixel data; and wherein the control unit controls said loop filter and comprises means for, in the interval between the blockwise decoding operations of two coded video pictures, addressing the picture memory again to select the block edge pixel data of the blockwise decoded video picture wherein the addressing is performed such that new redefined blocks are created which include the previously unfiltered block edge pixel data within the redefined block edges of the redefined blocks;

applying the previously unfiltered block edge pixel data to said loop filter for filtering, such that the same loop filter filters the previously unfiltered block edges.

2. The video decoder as claimed in claim 1, wherein said loop filter filters the pixel data of the blockwise decoded video picture in the interval between the blockwise decoding operations of two coded video pictures.

3. The video decoder as claimed in claim 2, wherein said control unit further comprises means for, in the interval between the blockwise decoding operations of two coded video pictures, activating said loop filter only for the block edge pixels.

4. A video decoder as claimed in claim 2, wherein the control unit selects the addresses of the picture memory which include block edge pixel data of the blockwise decoded video picture by redefining the geometrical positions of the decoded blocks to include portions of the decoded block edges by offsetting the redefined blocks vertically and horizontally with respect to the decoded blocks but by keeping the dimension of the redefined blocks the same as the decoded blocks.

5. The video decoder as claimed in claim 1, wherein the geometrical positions of the picture sections are offset vertically and horizontally with respect to the positions of the decoding blocks by half the block edge length.

6. The video decoder as claimed in claim 1, wherein said control unit further comprises means for, in the interval between the blockwise decoding operations of two coded video pictures, activating said loop filter only for the block edge pixels.

7. A video decoder as claimed in claim 1, wherein the control unit selects the addresses of the picture memory which include block edge pixel data of the blockwise decoded video picture by redefining the geometrical positions of the decoded blocks to include portions of the decoded block edges by offsetting the redefined blocks vertically and horizontally with respect to the decoded blocks but by keeping the dimension of the redefined blocks the same as the decoded blocks.

8. The video decoder as claimed in claim 7, wherein said control unit further comprises means for, in the interval between the blockwise decoding operations of two coded video pictures, activating said loop filter only for the block edge pixels of the decoded video picture which correspond to the peripheral pixels of the decoding blocks.

9. The video decoder as claimed in claim 8, wherein the offset vertically and horizontally with respect to the positions of the decoding blocks is by half the decoded block edge length.

10. A video decoder for performing blockwise decoding operations of a coded video picture using decoding blocks of pixel data having block edges which decoding blocks together form a coded video picture, comprising:

a picture memory for storing pixel data of the blockwise decoded video picture;

a loop filter for filtering the pixel data within the decoding blocks but not filtering the block edge pixel data of the blockwise decoded video picture;

a control unit for controlling the loop filter and the addressing of the picture memory such that for addresses of the picture memory which correspond to pixel data within a decoding block the loop filter is activated for filtering and for addresses of the picture memory which correspond to block edge pixel data the loop filter is deactivated from filtering, and for controlling, in the interval between the blockwise decoding operations of two coded video pictures, the loop filter and the addressing of the picture memory such that the decoding blocks are redefined to include redefined block edges wherein the redefined blocks include within the redefined block edges portions of the unfiltered block edges of previously filtered decoding blocks, and the control unit further controls the loop filter such that the same loop filter filters the pixel data within the redefined blocks including portions of the unfiltered block edges of the previously filtered decoding blocks but does not filter the pixel data along the redefined block edges.

11. A video decoder for performing blockwise decoding operations of coded video pictures by separating the coded video pictures into a plurality of blocks of pixel data, wherein each block is defined by block edges, and for post processing the blockwise decoded video picture, comprising:

a picture memory for storing the pixel data of the blockwise decoded video picture;

a control unit for blockwise selecting addresses of the picture memory;

a loop filter for receiving each block of pixel data selected by the control unit and for filtering the blocks of pixel data such that filtering is performed on the pixel data within the blocks but not along the block edges, and wherein the control unit also includes a device for, in the interval between the blockwise decoding operations of two coded video pictures, selecting addresses of the picture memory such that new blocks are defined which new blocks include the unfiltered block edge pixel data within the new block edges of the new blocks, and applying the new blocks to the loop filter such that the filter performs filtering on the pixel data within the new blocks but not along the new block edges, thereby filtering the previously unfiltered block edge pixel data.

12. The video decoder as claimed in claim 11, wherein during the interval between the blockwise decoding operations of two coded video pictures the loop filter is only activated for new block edge pixel data.

* * * * *